United States Patent [19]

Pinnow

[11] Patent Number: 5,537,102
[45] Date of Patent: Jul. 16, 1996

[54] APPARATUS AND METHOD FOR A SYSTEM CAPABLE OF REMOTELY VALIDATING THE IDENTITY OF INDIVIDUAL AND THEIR LOCATION

[75] Inventor: Douglas A. Pinnow, Laguna Hills, Calif.

[73] Assignee: Electronic Monitoring Systems, Inc., Laguna Hills, Calif.

[21] Appl. No.: 141,708

[22] Filed: Oct. 27, 1993

Related U.S. Application Data

[63] Continuation of Ser. No. 744,346, Aug. 13, 1991, abandoned.

[51] Int. Cl.$^6$ .................................................. G06F 7/04
[52] U.S. Cl. .............................. 340/825.30; 340/825.34; 340/573; 340/825.49; 379/38
[58] Field of Search ........................... 340/825.30, 825.31, 340/825.32, 825.33, 825.34, 825.49, 825.54, 825.69, 825.72, 573; 379/38, 102, 103, 104, 105, 106; 380/23, 25

[56] References Cited

U.S. PATENT DOCUMENTS

| | | | |
|---|---|---|---|
| 3,478,344 | 11/1969 | Schwitzgebel et al. | 340/825.44 |
| 3,594,503 | 7/1971 | Wolf | 178/88 |
| 4,063,410 | 12/1977 | Welling | 58/38 R |
| 4,126,762 | 11/1978 | Martin et al. | 179/2 A |
| 4,176,254 | 11/1979 | Tuttle et al. | 179/5 R |
| 4,348,744 | 9/1982 | White | 340/825.30 |
| 4,394,654 | 7/1983 | Hofmann-Cerfontaine | 340/825.34 |
| 4,449,040 | 5/1984 | Matsuoka et al. | 340/825.34 |
| 4,743,892 | 5/1988 | Zayle | 379/38 |
| 4,747,120 | 5/1988 | Foley | 379/38 |
| 4,847,614 | 7/1989 | Keller | 340/825.31 |
| 4,856,062 | 8/1989 | Weiss | 380/23 |
| 4,952,913 | 8/1990 | Pauley et al. | 340/573 |
| 4,962,530 | 10/1990 | Cairns | 380/23 |
| 4,973,944 | 11/1990 | Maletta | 340/568 |
| 4,978,303 | 12/1990 | Lampbell | 434/258 |
| 4,980,679 | 12/1990 | Klaubert | 340/765 |
| 4,999,613 | 3/1991 | Williamson et al. | 340/573 |
| 5,003,595 | 3/1991 | Collins et al. | 340/825.34 |
| 5,023,908 | 6/1991 | Weiss | 340/825.34 |

OTHER PUBLICATIONS

Electronic Monitoring Programme, The Hawk, 8/1988, Marconi Electronic Devices (Product Brochure), pp. 1–6 copy in 379/38 foreign references.
Solomon W. Golomb, *Shift Register Sequences*, 1967, pp. 5–6, 24–27, San Francisco, CA.
National Semiconductor data sheet, Device MM5437 Digital Noise Source.

*Primary Examiner*—Brent A. Swarthout
*Assistant Examiner*—Andrew Hill
*Attorney, Agent, or Firm*—Bacon & Thomas

[57] ABSTRACT

A system capable of remotely validating the identity of individuals and monitoring their locations includes a first device attached to the individual being monitored by a circumferential band worn around his wrist, ankle or neck that is capable of electronically generating a sequence of pseudorandom numbers that will cease to function if the band is cut or otherwise opened to detach the device from the individual. The system also includes a second device which is a remote microprocessor or computer based monitor synchronized to the same sequence of pseudorandom numbers and in occasional communication with the individual over telephone lines or some other remote means such as a radio frequency transmission link. The system may be used to limit remote access of computer data bases to authorized individuals or to limit entry to facilities such as offices or buildings on a campus. Access is authorized when the individual communicates a current valid pseudorandom number to the central computer-based monitor. The pseudorandom number sequence, which changes in time and cannot be predicted, serves as an access key which will only continue to function if it remains attached to the same individual. The same basic system can also be used to determine an individual's location for various purposes, such as electronic monitored house arrest, if the central based computer monitor can establish a telephone number that the individual responds to or if the individual's coordinates are established using some ancillary means such as a portable Loran receiver or a Global Positioning Satellite receiver carried by the individual being monitored.

27 Claims, 4 Drawing Sheets

FIG. 5

APPARATUS AND METHOD FOR A SYSTEM CAPABLE OF REMOTELY VALIDATING THE IDENTITY OF INDIVIDUAL AND THEIR LOCATION

This application is a continuation of application Ser. No. 07/744,346, filed Aug. 13, 1991.

BACKGROUND OF THE INVENTION

1. Field of the Invention

This invention relates to a system capable of remote validation of the identity of an individual.

2. Description of Related Art

Remote validation of the identity of an individual for access control is an age old problem that has many different solutions. The oldest and most common solution has been to issue a metal key to the valid user. The detailed shape of the key contains coded information. However, keys can be lost, stolen or duplicated and given to others, thereby compromising security.

The use of electronic identification cards such as credit cards with electronic or magnetic data codes for access control purposes has similar drawbacks. Credit cards can also be lost, stolen, and/or duplicated. For some financial transactions using credit cards, the coded information in the card must be complemented by a personal identification number (PIN) that the user is advised to commit to memory. This is so that a lost card will be of no value to anyone but the valid user. In practice, however, a substantial fraction of credit card users find it difficult to remember their PIN number, and therefore write it down on a slip of paper that they carry in their purse or wallet. If a thief steals a wallet or purse, he not only gets the credit card, but also the PIN as well.

In the case of remote identity validation for the purpose of "electronic house arrest," neither electronic identification cards nor keys are useful. While numerous remote validation systems have been proposed, each has significant drawbacks. Nevertheless, the demand for such systems is continually increasing.

The rapid growth in the field of electronic monitored house arrest is being propelled by several key factors, including the limited capacity of existing penal institutions, the substantial growth in crime rate and conviction rate in most major metropolitan areas, increasing taxpayer reluctance to bear the expense of expanded jail or prison facilities, resistance by citizen groups to the construction of new penal institutions in their neighborhoods, recognition that many convicted offenders do not represent a risk to society, so that incarceration is an unnecessary and expensive alternative to house arrest, and a growing awareness that electronic house arrest is the most cost effective alternative to effectively manage and monitor offenders who are not dangerous to society. A basic economic reality is that new prison facilities cost approximately $50,000 per prisoner to construct and approximately $50–60 per day to operate. In contrast, electronic house arrest can be provided for about $4 per day or less and, in many cases, the offender is willing to pay this fee for the privilege of not being incarcerated.

A number of electronic house arrest products have been introduced to the market in the past several years. At one extreme is a rather primitive system introduced by Digital Products Corporation, Inc. that requires the offender to wear a coded device on his or her wrist. The device is inserted into a special attachment on a telephone for verification, as described in U.S. Pat. No. 4,747,120. The system reliability depends primarily on the ability of a parole officer to recognize the voice of the offender when random telephone calls are made to the officer. This is because the wrist-worn device can be removed and left for someone else to insert into the telephone verifier while the offender is gone.

At the other extreme, there are very costly systems such as the video monitoring systems offered by Matsushita. This system can grab a single video picture of the offender and relay it over the telephone lines to a parole officer in approximately one minute. The offender is asked to do something recognizable such as "touch your left ear", in order to avoid use of a photograph positioned in front of the video camera.

The most popular type of system on the market today employs a coded radio transmitting device that is attached to the offender's ankle or wrist. The radio transmitter automatically sends a periodic coded signal to a receiver module attached to the offender's telephone. If the signal is not received, the receiver module automatically dials the parole officer to report a violation. Alternatively, the receiver module can be periodically interrogated for recent violations by an automatic telephone response device located in the parole officer's facilities. To enhance security against tampering, the radio transmitter is designed to stop functioning if it is removed from the offender's wrist or ankle. This type of radio equipment is available from BI Inc. and Digital Products, Inc. and is described in Pat. No. 4,747,120 to Foley, for example. Such systems have a history of problems that relate to various interferences that can disrupt the radio link. For example, if the offender walks behind a metal object, such as a refrigerator, or enters a room with metal foil wallpaper, the radio signal can be lost. This could trigger an investigation which is both expensive and undermines confidence in the system.

All of the current electronic house arrest systems require some attachments to an offender's telephone. This is even true for a voice recognition system capable of validating the presence of an offender by his electronic voice print in analogy with a finger print. Voice recognition could, in principle, be performed at a remote station without additional attachments to the telephone of a person being monitored. However, in practice, the low fidelity of a voice transmitted over the telephone system is not of sufficient quality for consistent and reliable detection. Thus, voice identification equipment must be located in the residence of the person being monitored with an attachment to the telephone. In addition to being expensive, voice recognition equipment is notorious for failing when the offender has developed a cold or congestion which alters his "voice print".

SUMMARY OF THE INVENTION

It is an objective of the present invention to overcome the drawbacks of prior art remote identity validation devices by providing an electronic "key" device that cannot be duplicated and that will cease to function if it becomes lost or stolen.

It is a further objective of the invention to provide an electronic key device capable of establishing the location of a valid user for various purposes such as electronic monitored house arrest.

These objectives are achieved by providing a key device capable of electronically generating and displaying a sequence of pseudorandom numbers that change in time.

The key is attached to the user by a circumferential band which is placed around the bearer's wrist, ankle, or neck, and will cease to function if the band is cut, otherwise opened, or detached from the user. The term "pseudorandom number" is intended to refer to any generated number which is not predetermined or known in advance by anyone not associated with the originator of a sequence of otherwise random appearing numbers.

The objectives of the invention are further achieved by using the electronic key device to enable the key holder to identify himself or herself over a telephone line by transmitting a current pseudorandom number over the telephone line. The pseudorandom number generator is synchronized with a pseudorandom number generator located in a central base computer. Because the user's key device will cease to function if it is separated from the user, the only way that a correct number code could be relayed back to the central computer by the user is if the user is actually present at the telephone line being monitored in order to convey the current pseudorandom number code. Alternatively, a person being monitored with the new security key as an identification means can establish his geographical coordinates using some ancillary means such as a portable LORAN receiver or a Global Positioning Satellite (GPS) receiver that is carried by the person being monitored.

A major advantage of using the new electronic key in conjunction with an electronic house arrest system is that there is no need for an attachment to the offender's telephone. It can be used in conjunction with any standard touch tone telephone set. This feature permits monitoring an offender both at home and at work without the need to duplicate expensive electronic devices that must be added to each telephone being monitored.

In the preferred embodiment of an electronic house arrest system, the offender wears a device on the wrist that resembles a wrist watch. The device may, for example, have a four character digital display that changes in a pseudorandom fashion at an irregular interval, such as every 41.152 seconds. This device will stop functioning if detached from the offender's wrist.

In operation, the preferred system uses a central station computer to automatically call the offender at random times during the day or night. The control station is synchronized in time with the wrist worn device on the offender, using precise quartz crystal timing. Thus, the offender's presence at the number called can be established by conveying the pseudorandom number code as shown on his wrist device, back to the central station. The validation can be entirely automatic following a protocol similar to the following:

First, the central station calls the offender at a random time with a recorded voice announcement:

"Hello. Is this John Q. Offender? If yes, please press the 'Y' button on your telephone. If no, please press the 'N' button."

If the 'N' button is pressed, the central station asks:

"Please ask John Q. Offender to come to the phone immediately. (pause) Is this John Q. Offender? If yes, please press the 'Y' button on the telephone."

The message is repeated until the 'Y' button is pressed or one minute has elapsed and the call is terminated.

The central station then requests that the Offender look at his or her wrist monitor and enter the current four digit pseudorandom number into the telephone by pressing the corresponding buttons on the telephone keyboard. The offender then enters the code displayed on the wrist monitor, and the central station repeats the entered code and gives the offender a chance to verify the code by pressing, for example the # button, or to enter a new code by pressing the * button.

Each morning the central station automatically prepares a report summarizing all of the offenders contacted during the previous 24 hours and highlighting all irregularities such as offenders using incorrect codes or offenders who do not respond to their calls. These offenders require human follow-up.

It is estimated that the average call to an offender lasts approximately 1½ minutes. Thus, 40 offenders may be contacted each hour and 960 could be monitored at least once every 24 hours. A reasonable monitoring frequency is one contact per day on average. The offenders are instructed that the calls are made on a completely random basis so that it would be possible, though not likely, for a second call to follow the first just several minutes later.

To ensure that the system is invulnerable to component failure or natural disaster, such as a fire at the central station or a long term power outage, a current backup database is preferably provided for all central stations at some common location. If a failure occurs at a particular central station, the appropriate database for that station would be loaded into a temporary station and monitoring of offenders would resume, possibly over long distance telephone lines. In an alternative preferred embodiment, each central station may have a redundant backup system locally. If the reliability of state-of-the-art telephone response systems is sufficiently high, so that the down time is low, a single backup at a remote location would be favored.

The wrist-worn device of the preferred embodiment is relatively inexpensive, may be leased or rented to the user for the privilege of avoiding incarceration, and requires no other special electronics in the offender's residence. This greatly reduces the cost of maintaining the system. It is well-known that electronics leased to home and apartment dwellers are particularly vulnerable to damage and theft. For example, this is a substantial problem for cable TV system operators whose customers are typically not criminals. The situation would be expected to be more serious in the case of convicted offenders, in which case the simplicity of the preferred system is especially advantageous.

The low maintenance and operating cost for the new electronically monitored house arrest system results in favorable lease rates, and thus goes a long way towards ensuring that electronic house arrest is not just the privilege available only to the wealthy.

There are many additional features and technologies that can be added to expand the capabilities of the basic system, as will be described in detail in the following sections.

DETAILED DESCRIPTION OF THE PREFERRED EMBODIMENTS

Figure 1:
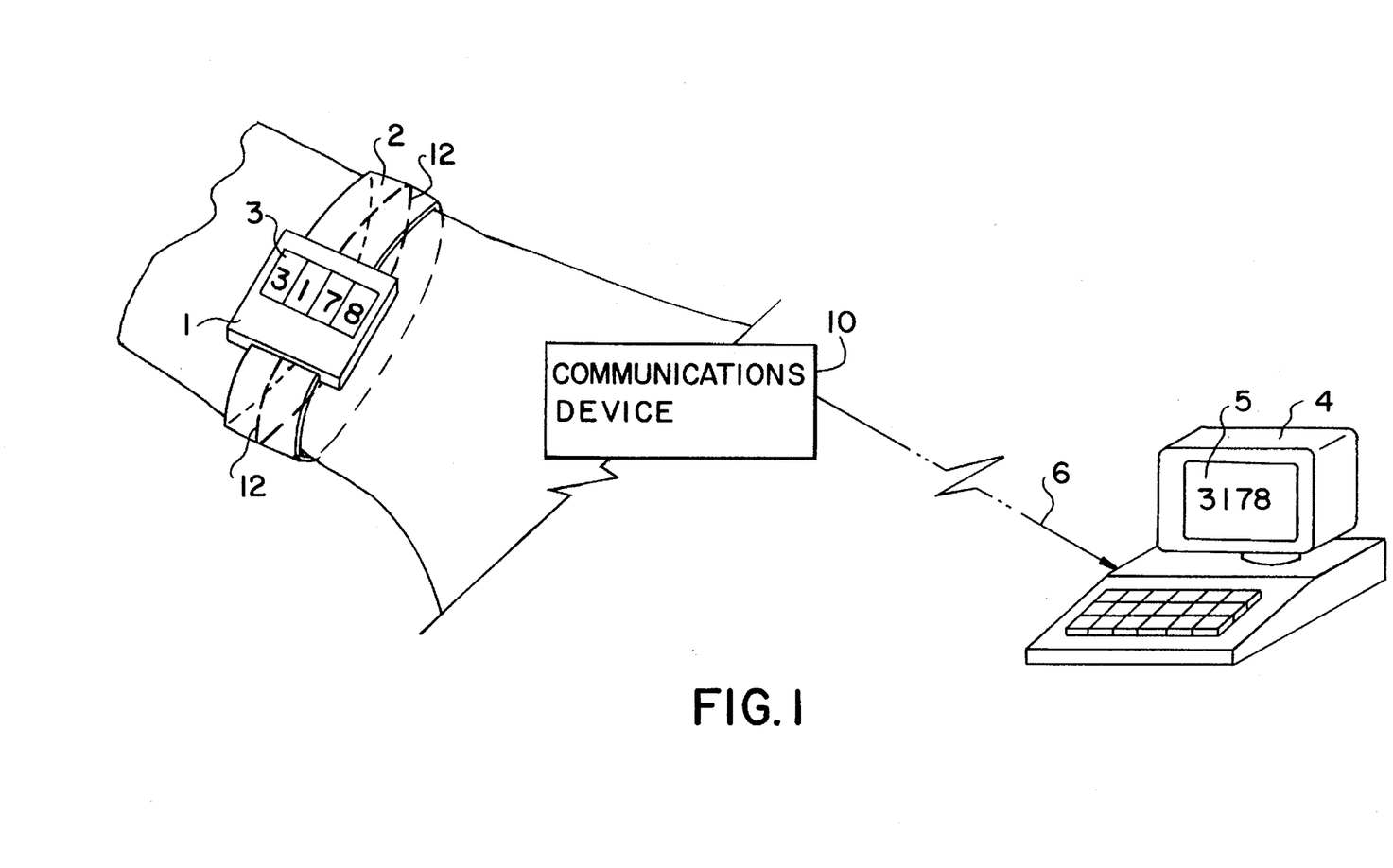
FIG. 1 is a perspective view of an electronic key device attached to an individual's wrist with a circumferential band and a remote computer monitoring station in accordance with a preferred embodiment of the invention.
Figure 2:
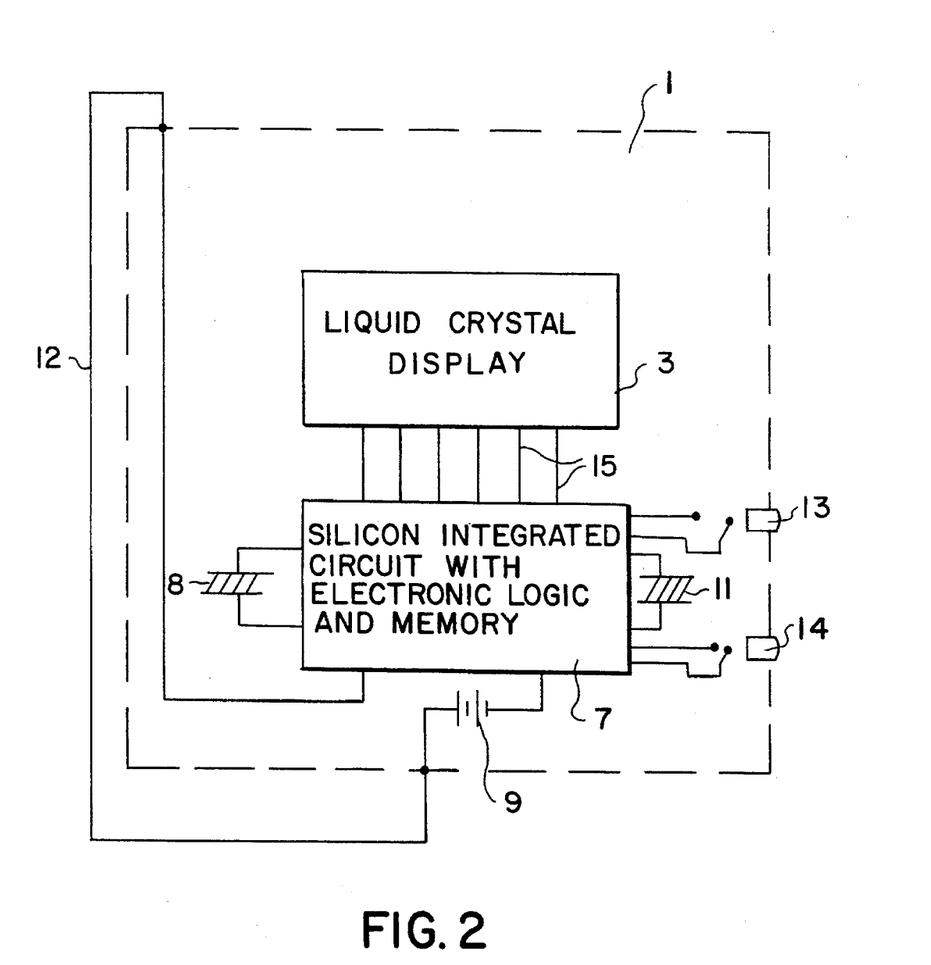
FIG. 2 is a circuit diagram for the electronic key device of FIG. 1.

Referring to FIGS. 1 and 2, a wrist watch-like electronic key device 1 is attached to the wrist of a user by a band 2, and includes a liquid crystal display 3 that changes according to a pseudorandom sequence at predetermined times. For example, the display may use a quartz crystal oscillator 8 to synchronize the device to a clock at a remote computer station 4 having a display 5. Remote station 4 may be used to monitor a plurality of individual devices identical to device 1 except that the individuals preferably are differentiated by providing a different pseudorandom number sequence for each individual. The positions of the individuals are preferably graphically displayed on display 5.

Silicon integrated circuit 7 need be no more complicated than the circuit used to establish time in a conventional digital wrist watch, except that quartz crystal 8 operates at some frequency other than 32,768 Hz, which is the standard frequency for quartz wrist watches. For example, use of a frequency of 40,000 Hz will cause the digital display 3 to change at a non-standard interval, such as every 41.152 seconds, rather than the standard 60 second interval. Although the sequence need not be truly random, the effect is the same because the sequence cannot be predicted by the user in advance, and thus is pseudorandom.

The normal time information may be converted into a pseudorandom number code in the liquid crystal display 3 by simply permuting two or more of the displayed digits by interchanging the conductors 15 that connect the liquid crystal display to the silicon integrated circuit (IC) chip. Alternatively, the pseudorandom number may be advanced at pseudorandom time intervals after some event has occurred, such as pushing a button 14 on the device after the receipt or origination of a communications link 6 between monitoring station 4 and communications device 10 accessible by the wearer of the device 1.

Device 10 may take the form of an ordinary telephone, or a radio transceiver. Remote validation of identity is accomplished by prompting the user to read the current number on his wrist display 3 and transmit the number to the remote station 4 where the number is compared with the current number generated at the remote station 4. So long as a circuit 12 in the band has not been broken by removing the band, the displayed numbers remain synchronized and the number read by the user will be correct.

Wrist watch band 2 is integral to the device and carries electrical or optical circuit 12 which interrupts the pseudorandom sequence, when opened, and which may reset the sequence if the band is subsequently closed. Circuit 12 is shown in dashed line in FIG. 1. This can be accomplished with a standard silicon IC used in wrist watches by connecting battery 9 to the IC via the electronic circuit 12 extending through band 2. In some instances, the device may be worn on an ankle or neck. In these cases, the band must be suitably adjusted.

Figure 3:
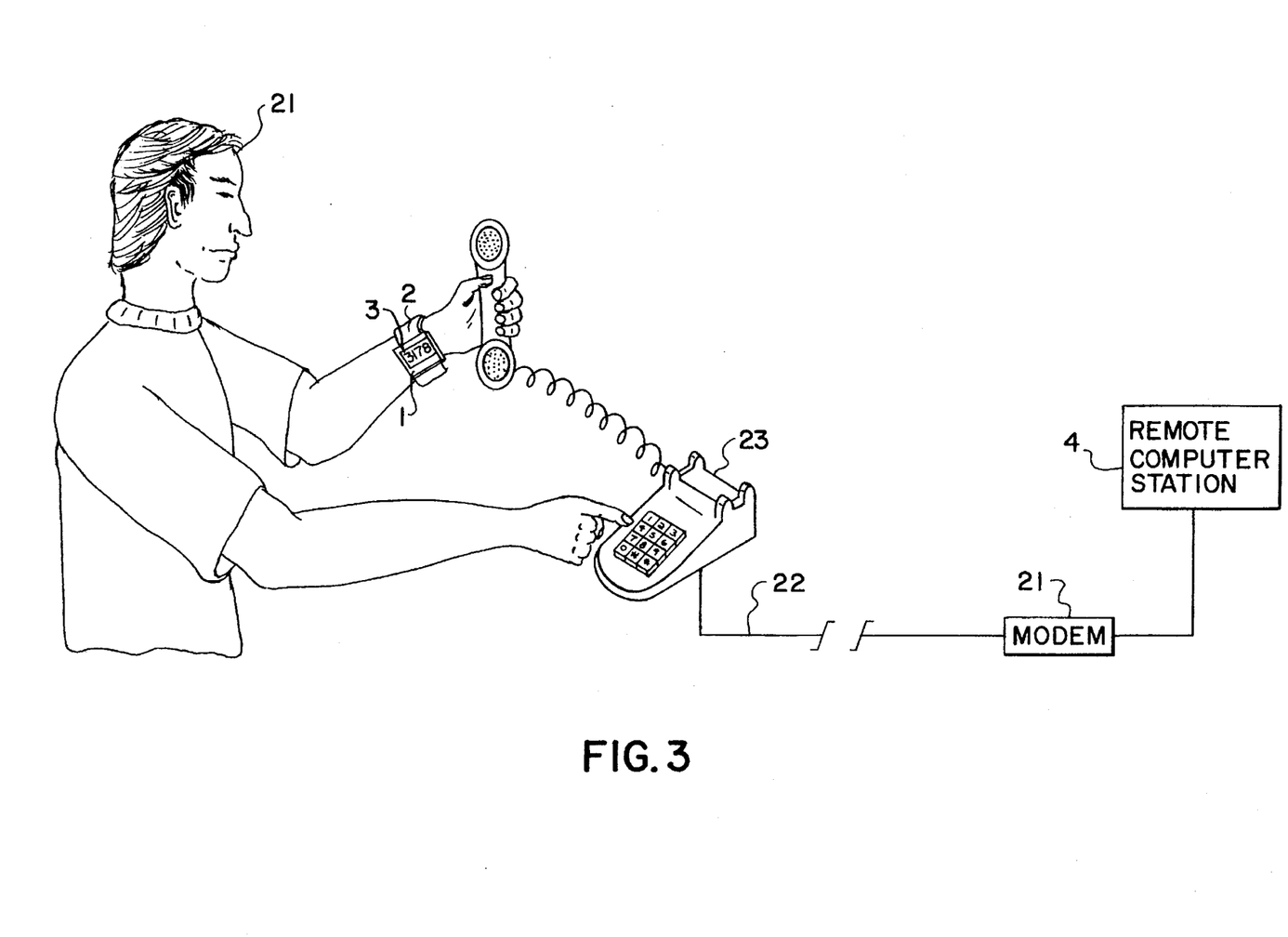
FIG. 3 shows an embodiment of the invention in which the key device of FIG. 1 is used for an electronic monitored house arrest system.

FIG. 3 illustrates an embodiment in which the wrist display is used as a personal identification device to identify whether a person is at a particular telephone number. This system is similar to the more general system of FIG. 1, but is especially applicable for electronic house arrest situations. Communication occurs over a touchtone telephone line 22 between person 21 wearing the wrist device 1 and a central computer monitoring station 4 which is programmed to randomly place a call through a telephone modem 20 to the person wearing the wrist device at his or her home, work, etc. and request identification by having the person key into the touchtone telephone 23 the current pseudorandom number shown in the display 3 of wrist device 1.

The computer at station 4 is programmed to generate the same sequence of current pseudorandom numbers as wrist device 1, or a sequence from which the current pseudorandom number can be calculated, and therefore verifies whether the person answering the telephone call is the person called. Because the wrist device cannot be removed from a person's wrist without interrupting the sequence of pseudorandom numbers, the system provides positive identification.

The following enhancements may be used with the basic electronic monitored house arrest system described above:

1. The wrist device display may be arranged to display the pseudorandom number only when a button 13 is pushed on the wrist device, and the number of times per day that this button may be pressed can be limited so that the wearer would not be tempted to try to study and break the pseudorandom code.

2. A piezoelectric ceramic disc 11 with electrodes on front and back surfaces, or some other type of sound generator, may be provided to "beep" the pseudorandom code in any of a number of digital formats, including a serial data bit stream superimposed on a fixed acoustic tone or a serial sequence of varying acoustic tones, over the telephone line in response to a telephone request from the remote microprocessor or computer monitoring station 4. The user would press a button on his wrist device and then place it next to the telephone mouthpiece so that the frequency tones would be picked up by the microphone in the mouthpiece of the telephone.

3. In cases where the person being monitored does not have a telephone at home, the wrist device may be arranged to generate an audible alarm beep at pseudorandom time intervals indicating that the wearer must place a telephone call remote to the microprocessor or computer monitoring station within a short interval. The individual would immediately go to a predetermined telephone (e.g., a pay phone) and call the monitoring station. If the new SS-7 (Automatic Number Identification) switching system were operating, the SS-7 system would forward the telephone number of the calling party. If not, the person calling would be requested to transmit his telephone number to the central station and hang up and wait for an immediate return call. The person receiving the return call would then identify himself by communicating the current pseudorandom number on his wrist device.

4. Alternatively, if the person being monitored does not have a telephone at home, the person may be provided with a conventional paging device that will prompt him as to the time he should initiate a verification call to the monitoring computer.

5. An optional convenience would be to arrange a device with any of the above features to also serve as a wrist watch for telling time.

In certain cases, an individual may not have a telephone and may not be located where telephone service is available. In such cases, the electronic key 1 may still be useful for electronic monitored house arrest if used in conjunction with position locating systems such as Loran C, the Global Positioning Satellite (GPS), or time delay triangulation systems, such as the one used by International Teletrac for recovering stolen vehicles in conjunction with a telephone paging system. Other positioning systems are worthy of consideration, although it is an advantage to use established systems rather than dealing with the major expense of introducing a new system. In all cases, the watch-like device 1 with a pseudorandom number code display 3 serves as a positive means for identifying the individual, while the positioning system is used to establish location coordinates at the time a request from the monitoring station is made.

Figure 4:
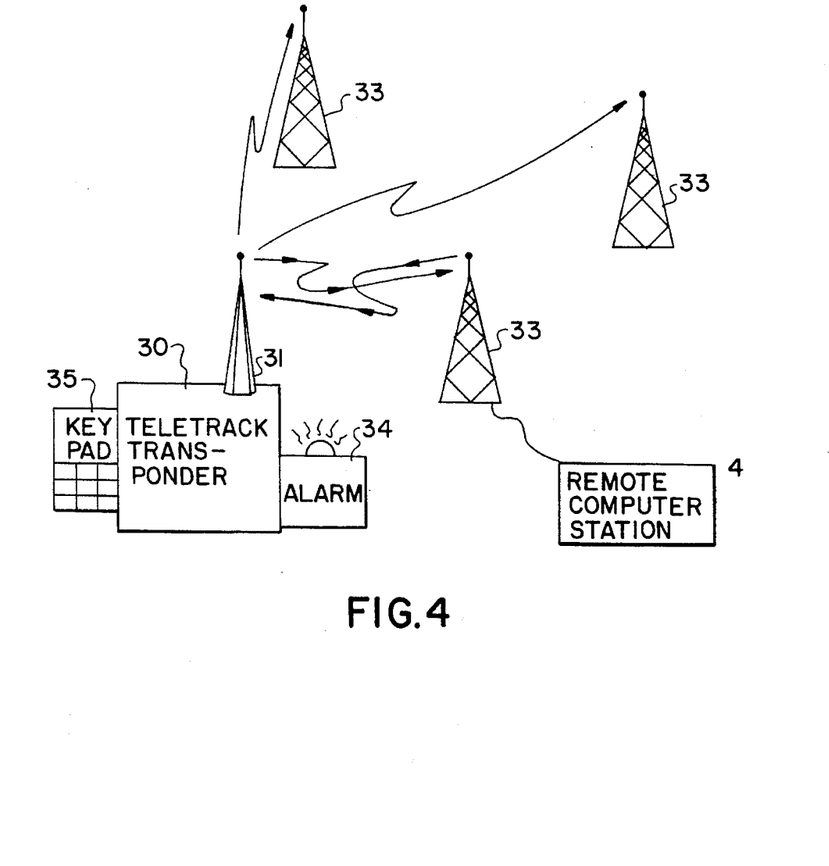
FIG. 4 illustrates an alternative embodiment of the invention including an electronic monitored house arrest system that operates with a Teletrac transponder.

FIG. 4 shows an International Teletrac transponder 30 having an antenna 31 and which is similar to the one used on trucks and cars for vehicle locating and tracking. The transponder can be packaged in a briefcase or some other convenient portable package that is battery operated. A recharger may be provided for recharging the battery at night, while the transponder remains fully operational.

In operation, a radio frequency signal is sent out over paging network 33 addressed to a specific transponder 30, requesting its location. The transponder alerts the individual being monitored with an audible and/or visual alarm 34 that a response is required. The person being monitored identifies himself to the transponder by transferring his current pseudorandom code into the transponder with either a keypad 35 or by acoustic, optic, or radio coupling, as described previously. The transponder then relays this code information back over the pager network along with a narrow locating pulse. Time, location and personal verification is then performed at the remote station.

Unlike the International Teletrac system, which is a two way system, Loran C and GPS are one way transmission systems and thus have no return signaling capabilities. There are a number of small portable Loran C and GPS devices about the size of a pocket calculator or pocket book which are presently commercially available and which can accurately establish location within tens of feet to several hundred feet. These devices may be modified to include a clock 41, memory 43 and suitable data input/output interfaces, 42 and 44, respectively integrated into a convenient and portable battery operated package, as shown in FIG. 5.

Figure 5:
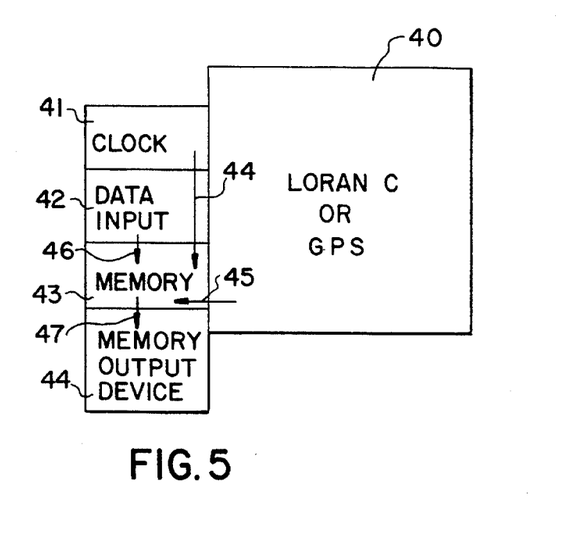
FIG. 5 is a block diagram of an electronic monitored house arrest system using a Loran C receiver or a Global Positioning Satellite receiver according to another preferred embodiment of the invention.

In one mode of operation, the wrist device 1, described above, would notify the person wearing it at pseudorandom time intervals that he must transfer his present code to the Loran C or GPS unit 40 depicted in FIG. 5. The unit would include additional means to then record, in memory 43, as indicated by respective arrows 44, 45, and 46, the time based on an integral clock 41, the location of the unit, and the current pseudorandom code entered by the wearer into data input unit 42. This information, and other similar checkpoints could then be played back as indicated by arrow 47 over a telephone line using an acoustic means or other memory output device 44 similar to that described above in connection with FIGS. 1 and 2, at some convenient time, for example at the end of the day or once per week, depending on the level of security desired by the monitoring authority.

Alternatively, the modified Loran C or GPS unit could be in communication with the wrist or ankle worn device by a short range radio transmission link with a range of, for example, 200 feet or less. The identification by transfer of the code could then be accomplished entirely automatically so that the person being monitored would not have to do anything. In fact, the person could be monitored as he slept. This type of system could establish a record of the person's location at regular time intervals or at pseudorandom time intervals. Transmission could be accomplished every few minutes or even every fraction of a minute, if desired, to provide a complete daily history of the person's movements.

If the transfer of information from the wrist or ankle device 1 is done by a radio link or by an acoustic or optic relay, there is no need to use a pseudorandom rolling code. A fixed code would suffice so long as the person doesn't see the code. However, there is always a security advantage in using the pseudorandom code so that audio tape recorders or other electronic playback devices would not be used to defeat the intent of the system.

In another variation of the preferred embodiment of the invention, referring back to FIG. 1, a wrist worn device 1 as described above is used for gaining access to secure facilities or for accessing computer data bases, and especially for remote access of these data bases over telephone lines. The device could optionally be made more useful with the addition of an attractive time display feature, offering both security and a degree of "status" to the wearer. The person wearing the device would be required to wear the device continuously, for 24 hours per day. If he or she were ever to remove it, the pseudorandom number code sequence would be interrupted or reset and it would no longer be recognized as being valid by the computer system. In that case, the individual would be required to report back to a security officer or some other individual of authority and identify himself in order to have his pseudorandom number sequence resynchronized with the computer system.

In operation from a remote telephone, an authorized person wearing the wrist device first establishes contact with a telephone modem in remote station 4. He or she then provides identification either by name or some fixed personal identification number (PIN). Finally, the central computer asks for the current pseudorandom number to complete the identification process. The advantage of this system is that the authorized user cannot give his key away to someone else. Even though he can pass on his PIN number, there is no way to hand over the pseudorandom number code because the user cannot predict what the code number will be in some future time, and detachment of the device from the user's body breaks the proper pseudorandom sequence.

In another preferred embodiment of the invention, a calculator-like wrist watch device is provided. In operation, the wearer enters his PIN number into the calculator keypad. The device then responds with the current pseudorandom number code. If an improper PIN is used, the wrist device displays an incorrect pseudorandom number. Such a device would be useful for authenticating a security agent in the field. If the agent is captured and pressured, he could either open his wrist strap to break the pseudorandom sequence or give a false PIN. In either case, there would be no way for the agent's adversaries to know if they have the correct number code unless they used some type of truth serum injection. The central station could be programmed to provide false information, rather than to withhold information, in the event that a wrong code were used. This would protect the agent from further pressure.

An infrared or acoustic sensor may be added to the wrist worn device to detect the pulse of the wearer such that the wrist worn device would cease to function or the pseudorandom number sequence would be reset if this sensor detected an extended interruption of the pulse. Thus, if the wearer were to die or be killed, the wrist worn device would have no further value.

While the present invention has now been described in terms of preferred embodiments and exemplified with respect thereto, one skilled in the art will readily appreciate that various modifications, changes, omissions and substitutions may be made without departing from the spirit thereof. It is intended, therefore, that the present invention be limited solely by the following claims.

I claim:

1. A system for remotely validating the identity of an individual, comprising:

a first device including first number generating means for generating a first sequence of numbers and attachment means for attaching the device securely to the individual such that the first device will cease to generate successive numbers in said first sequence if it is removed from the individual;

a second device remote from the first device and including second number generating means for generating a second sequence of numbers and means for comparing said first and second sequences of numbers, and means for establishing a remote communication between said first and said second devices in order to communicate the current number in the first sequence to said second device and, if the current number in the first sequence matches the current number in the second sequence, determine that the identity of the individual is valid, further comprising means for causing said first device to alert said individual at pseudorandom time intervals that the individual must initiate contact to said second device within a limited time interval when establishing said remote communication.

2. A system as claimed in claim 1, wherein said first and second number generating means comprise respective first and second timing means for synchronizing said first and second sequences, and wherein said first timing means is a quartz crystal oscillator.

3. A system as claimed in claim 2, wherein said quartz crystal operates at a frequency other than 32,768 Hz.

4. A system as claimed in claim 1, further comprising a plurality of individual devices identical to said first device, each of said individual devices attached to one of a plurality of individuals, and wherein each of said plurality devices is monitored by said second device.

5. A system as claimed in claim 1 wherein said first device further comprises liquid crystal display means for displaying said first sequence of numbers.

6. A system as claimed in claim 5, wherein said first device comprises a sound generating element including a piezoelectric ceramic disc with electrodes on front and back surfaces.

7. A system as claimed in claim 5, further comprising means including a button for making the liquid crystal display intelligible only when the button is pressed.

8. A system as claimed in claim 7, further comprising means including a counter for limiting the number of times the button may be pressed during a predetermined time interval.

9. A system as claimed in claim 5, further comprising means for enabling said individual to enter a personal identification number in said first device before said first sequence of said pseudorandom numbers is displayed in the liquid crystal display.

10. A system as claimed in claim 9, wherein said first device comprises a calculator wrist watch which includes, in addition to a calculator and watch, said first pseudorandom number generating means.

11. A system as claimed in claim 9, further comprising means for displaying a number on the liquid crystal display which is not a current number in said first pseudorandom sequence if an invalid personal identification number is entered.

12. A system as claimed in claim 1, wherein said first device further comprises means for displaying the current time.

13. A system as claimed in claim 1, further comprising means for permitting the individual to communicate his present telephone number to said second device, and means for causing said second device to subsequently call back over a telephone system to verify that the individual is actually present at said particular telephone number.

14. A system as claimed in claim 1, further comprising means for causing the individual to initiate a telephone call to said second device in order to establish said remote communication, and automatic number identification means for automatically forwarding the telephone number of the calling party to the receiving party.

15. A system as claimed in claim 1, comprising means for causing a new number in said first number sequence to be generated after a button on said first device is pressed by the individual in response to an external event.

16. A system as claimed in claim 1, wherein said attachment means comprises a band and an electrical circuit passing through the band, said circuit being opened if said first device is removed, causing said first device to cease to function.

17. A system as claimed in claim 1, wherein said attachment means comprises an optical fiber circuit passing through a circumferential band associated with said first device which is interrupted if said first device is removed and causes said first device to cease to function.

18. A system as claimed in claim 1, further comprising means for causing said first device to cease to function if a sensor associated with said first device detects an extended interruption of a pulse of said individual.

19. A system as claimed in claim 1, further comprising means for causing said first device to alert said individual at time intervals that the individual must initiate contact to said second device within a limited time interval.

20. A system as claimed in claim 19, further comprising means for permitting the individual to communicate his present telephone number to said second device, and means for causing said second device to subsequently call back over a telephone system to verify that the individual is actually present at said particular telephone number.

21. A system as claimed in claim 19, comprising means for causing the individual to initiate a telephone call to said second device in order to establish said remote communication, and automatic number identification means for automatically forwarding the telephone number of the calling party to the receiving party.

22. A system as claimed in claim 1, wherein said attachment means comprises a band and an electrical circuit passing through the band, said circuit being opened if said first device is removed, causing said first device to cease to generate successive numbers in said first sequence.

23. A system as claimed in claim 1, wherein said attachment means comprises an optical fiber circuit passing through a circumferential band associated with said first device which is interrupted if said first device is removed, causing said first device to cease to generate successive numbers in said first sequence.

24. A system as claimed in claim 1, further comprising means for causing said first device to cease to generate numbers in said first sequence if a sensor associated with said first device detects an extended interruption of a pulse of said individual.

25. A system for remotely validating the identity of an individual, comprising:

a first device including first number generating means for generating a first sequence of numbers;

a second device remote from the first device and including second number generating means for generating a second sequence of numbers and means for comparing said first and second sequences of numbers; and means for establishing a remote communication between said first and said second devices in order to communicate the current number in the first sequence to said second device and, if the current number in the first sequence matches the current numbers in the second sequence, determine that the identity of the individual is valid, wherein said first device further comprises sound generating means for generating an audio response and means including a button on said first device for initiating generation of said audio response in order to communicate the current number in said first number sequence over a telephone link to said second device during said remote communication.

26. A system as claimed in claim 25, wherein said audio response from said first device comprises a serial data bit stream superimposed on a fixed acoustic carrier tone.

27. A system as claimed in claim 25, wherein said audio response from said first device comprises a serial data bit stream of varying acoustic tones.

* * * * *